UNITED STATES PATENT OFFICE.

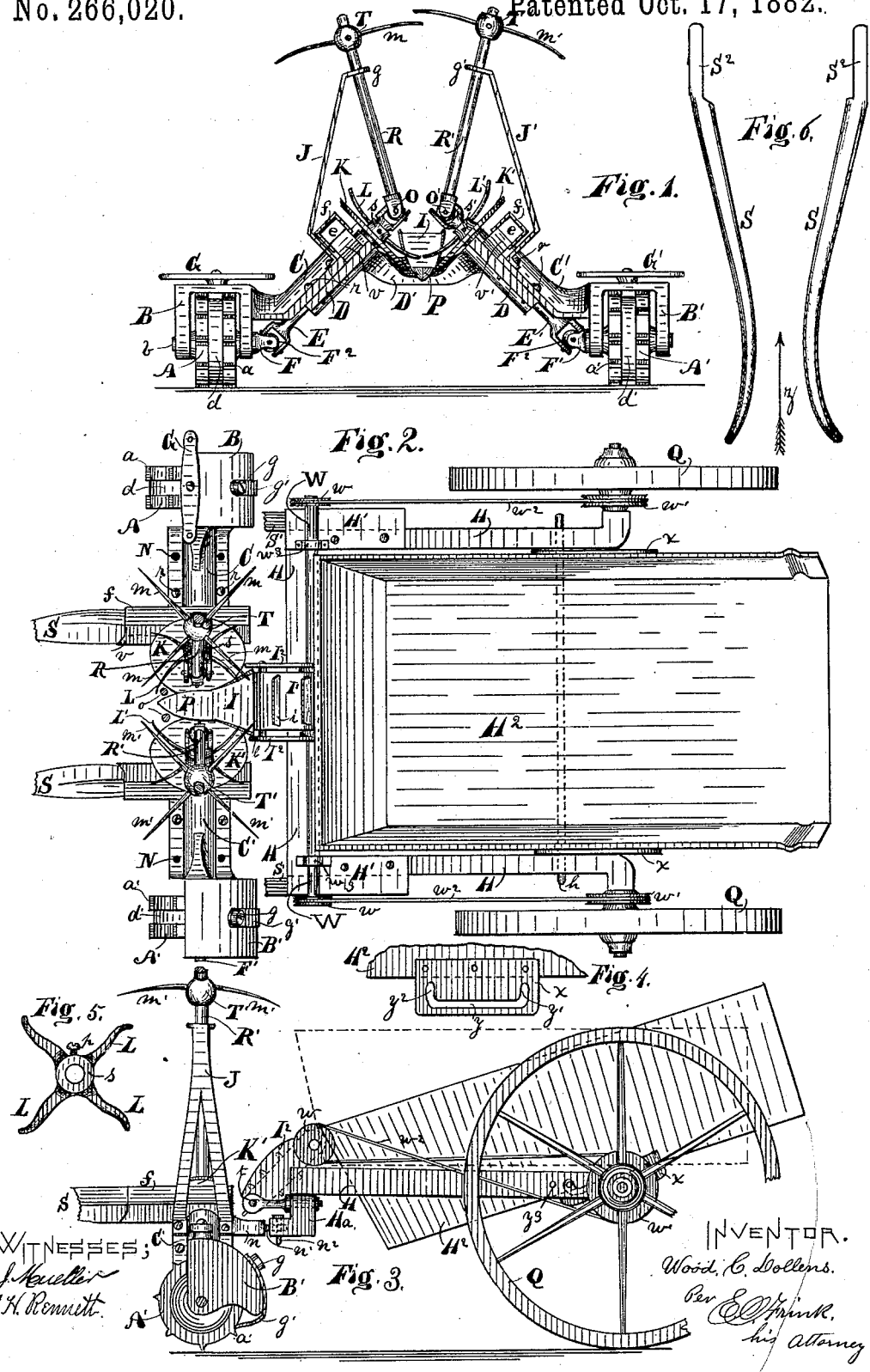

WOOD C. DOLLENS, OF COVINGTON, KENTUCKY, ASSIGNOR TO ALBERT GALL, OF INDIANAPOLIS, INDIANA.

SUGAR-CANE AND MAIZE HARVESTER.

SPECIFICATION forming part of Letters Patent No. 266,020, dated October 17, 1882.

Application filed January 28, 1881. (No model.)

*To all whom it may concern:*

Be it known that I, WOOD C. DOLLENS, a citizen of the United States, residing at Covington, in the county of Kenton and State of Kentucky, have invented a new and useful Improvement in Sugar-Cane and Maize Harvesters, of which the following is a specification.

My invention relates to improvements in sugar-cane and maize harvesters in which the ground-wheels operate in conjunction with tumbling-shafts, revolving disk-cutters, and revolving reels; and the objects of my improvements are, first, to provide the traction-wheels with tumbling-rods and universal joints for operating the disk-cutters and reels; second, to afford facilities for guiding sugar-cane and maize stalks to the cutters; third, to provide a means for carrying the cane or maize stalks backward into a cart as the cutters cut them off; fourth, to afford a means of adjustment to the stalk-carriers, so as to adapt them to high or low cane or maize; fifth, to provide an adjustable tilting cart to operate in conjunction with the stalk-cutting apparatus, for the purpose of collecting the stalks, when cut, and depositing them in heaps, as desired; sixth, to afford facilities on the cart for adjusting it forward to form an ordinary cart to dump backward, and to permit the cart-bed to be tilted down at the front end to receive the cut stalks, also to dump them. These objects I accomplish by the mechanism illustrated in the accompanying drawings, in which—

Figure 1 represents a front elevation of the stalk-cutting apparatus detached from the cart. Fig. 2 is a top view of Fig. 1, with the elevator and cart attached. Fig. 3 is a side view of Fig. 2. Fig. 4 is a detached section of the cart-bed, showing the device for adjusting it forward or backward, and holding it in position when adjusted. Fig. 5 is a plan view of one of the lower revolving feeders for carrying the stalks in contact with the cutters, and for carrying the butt-ends of the stalks, after cutting, backward to the elevator; and Fig. 6 is a top view of the stalk-gatherer and guiding-arms, which also serve as a tongue for the cart.

Similar letters refer to like parts throughout the various views.

A A' represent two traction-wheels, each being provided with spurs $a$ and groove $d$. The wheels A A' are mounted on short axles F F', and operate in their housing B B'. At the rear side of each housing B or B' is a spring-scraper, $g'$, secured to the housing by the bolt $g$. The lower end of each of these scrapers operates in the groove $d$ or $d'$ of the wheels A or A', and scrapes off any dirt which may stick to said wheels.

The shafts or axles F F' of the wheels A A' are each provided at one end with a universal joint, $F^2$, as shown in Fig. 1.

The housings B and B' are each provided with their respective angular arms C C', to the lower sides of which are bolted the arms D D of the bridge-frame D'. The arms D D of the bridge-frame D' are preferably arranged at an angle of forty-five degrees, but may be at a less or greater angle, if desired. The arms C C' and D D form bearings for the tumbling-rods E E', and the arms C C' may be adjusted up or down on the arms D D to widen or narrow the gage of the wheels A A' and bring the cutters K K' lower down or higher up by removing the bolts $r\ r$ and inserting them in different holes, as at N N, Fig. 2. The tumbling-rods E E' may also be made extensible in any ordinary manner to permit them to be adjusted in length to correspond with the adjustment of the arms C C' and D D. The above-described adjustment, however, is not absolutely necessary, and may be dispensed with, if desired. Each end of the tumbling-rods E or E' is provided with ordinary universal joints, O or O'. Near the upper ends of the rod E or E', just below the lower halves of the universal joints O or O', each rod has firmly secured thereto the disk-cutter K or K', and immediately above said disk-cutters, and between said cutters and the universal joints, is also secured the feeder $s$ L or $s'$ L', Figs. 1, 2, and 5.

It is obvious that the arms L of the feeder $s$ may, if desired, be made a part of the universal joint which is immediately above it; but I prefer to have the feeder separate, as shown.

The inclined rods or shafts R R' have their lower ends connected with the tumbling-shafts E E' by the universal joints O O'. The upper ends of these rods R R' are supported in suitable bracket-bearings, J J', the lower ends of which are secured to the arms C C' of the wheel-housings. Said brackets may be made adjustable forward and backward. Near the upper ends of the rods R R' are secured the adjustable reels T m T' m', which are employed to carry the tops of the cane or maize stalks backward as they are cut and throw them either on the ground or into the cart-bed H². These reels T T' are adjustable up and down to suit high or low cane or maize. They may also be adjustable forward or backward.

The central portion of the bridge D' is provided with a forward-projecting finger, P, having cutting-edges, against which the revolving disk-cutters K K' operate to cut the stalks. The rear side of the bridge D', immediately behind the cutting-finger P, is also provided with an inclined table, I, for guiding the cornstalks onto the elevator I'. The elevator-belt I' is mounted on suitable shafts with rollers, the lower shaft being secured to the downward-projecting part Ha of the frame H, Fig. 3, by the eyebolts t, while the upper shaft, W, is mounted in boxes $w^3 w^3$ on the top of the frame H, as shown in Fig. 2, (this form of elevator may be dispensed with and various other equivalent devices employed to elevate the stalks,) the operation of which will be hereinafter described.

To the arms D D of the bridge, or to the upper ends of the arms C C' of the wheel-housings, are secured the sockets f f, adapted to receive and hold the rear ends, S, of the forward-projecting curved arms S S, which form the means to guide the stalks to the cutters, as shown in Fig. 2, but more fully in Fig. 6.

Each end of the elevator-shaft W is provided with a band-wheel or sheave, w w, and motion is communicated to said elevator-shaft by the belts $w^2 w^2$, which operate over pulleys or sheaves w' w', attached to the hubs of the cart-wheels Q, as shown in Figs. 2 and 3.

The frame H of the cart is U-shaped, as shown in Fig. 2, its ends being turned outward to form axles for the cart-wheels Q Q. The front of the frame H forms a support for the boxes $w^3 w^3$ of the elevator-shaft; also a support for the front end of the cart-bed H², when said bed is in the position indicated by dotted lines in Fig. 3, and used as a cart; also to form a support for the upper front edge of the cart-bed to rest against when said bed is tilted down at its front to receive the cane-stalks from the cutters and table I, as also shown in Fig. 3.

At each side of the cart-bed is secured a plate, x, each plate having a horizontal slot, y, with recesses y' y². In these U-shaped slots the tie-bar h is inserted, and said bar is made fast in holes $y^3$, formed in the rearward-projecting legs of the frame H. This rod and the U-shaped slotted plate x form the main support for the cart-bed, and when the cart-bed H² is moved forward, so that its lower front edge will rest on the front part of the frame H, the rod or bar h is in the rear recess, y', of the plate x; but when the cart-bed is tilted down in front, then the bed is adjusted so that the bar h is in the front slot, $y^2$, as shown in Fig. 3.

The rear portion of the bridge D' is provided with a rearward-projecting coupling-plate, n', which fits in a corresponding socket formed in the front part of the frame Ha, and is coupled thereto by the pin $n^2$, as shown in Fig. 3.

The operation of my improved machine is as follows: When it is desired to cut cane or maize the horses are attached to single-trees G G', which are attached to the housings B B', and the cart-bed H² is tilted down at its front end, as in Fig. 3. As the horses pass along in the furrows between the stalks said stalks are gathered between the curved arms S S and are guided to the cutters K K' P. The wheels A A' as they revolve also revolve their respective tumbling-shafts F E R F' E' R' and the lower feeders, s L s' L', also the upper reels, T m T' m'. At the same time the disk-cutters K K' are revolved. As the stalks o, Fig. 2, come in contact with the disks K K', the arms L L' of the feeders s s' force them backward between the cutting-edges of the finger P and cutting-disks. The disks then cut the stalks off with a shear cut, and the arms L L' of the feeders then carry the lower ends back up the incline plane I onto the elevator. At the same time the upper reels, T m T' m', carry the upper ends of the stalks backward and permit them to drop into the cart-bed H². When the cart-bed is full of stalks it is tilted up at its front end until they slide out at the rear, the horses being temporarily stopped. Then the bed is replaced in its former position for another supply and the horses started again.

If it becomes necessary or desirable to use the cart at any time and not use the cutting apparatus, then the king-bolt $n^2$ is removed from the coupling n n'. The curved stalk-guides S S are then removed from their sockets f f and inserted in the sockets H' H' on the cart-frame H, when they become shafts, as shown at S S, Fig. 2. The cart-bed H² may then be adjusted forward with the bar h in the rear slots, y', of the plate x, and the cart may be used for ordinary hauling.

It is obvious that a wheel with bars or ribs on its periphery may be employed in the rear of the inclined table I for elevating the stalks when cut, and that said wheel operates the same as the upper roller for the belt-elevator, and by the same means as before described.

No claim is here made to the tongue of two parts serving as divergent guides for the stalks. I propose to embody such in a separate patent.

What I claim as new, and desire to secure by Letters Patent, is—

1. In a sugar-cane and maize harvester, the frame composed of the bridge D', with angular arms D D, and the housings B B', with arms C C', substantially as shown and described.

2. In a sugar-cane and maize harvester, the housing B, with arm C, combined with the arm D of the bridge D', and the wheel A, with shaft F, having a universal joint, F², at one end, substantially as shown and described.

3. In a sugar-cane and maize harvester, the combination of the wheel A, the shaft F, the shaft E, and shaft R, said shafts being united together by universal joints F² O, all substantially as shown and described.

4. In a sugar-cane and maize harvester, the combination of the wheel A, shafts F and E, with universal joint F², and the revolving cutting-disk K, as and for the purpose specified.

5. In a sugar-cane and maize harvester, the combination of the wheel A, the shafts F and E, with universal joint F², the revolving disk-cutter K, and feeder s L, substantially as shown and described.

6. In a sugar-cane and maize harvester, the combination of the wheel A, the shafts F and E, with universal joint F², the revolving disk-cutter K, feeder s L, and projecting finger P of the bridge, having cutting-edges, substantially as shown and described.

7. In a sugar-cane and maize harvester, the combination of the wheel A, the shafts F, E, and R, with universal joints F² O, and the adjustable reel T m, substantially as shown and described.

8. In a sugar-cane and maize harvester, the bridge D', with angular side arms, D D, the central forward-projecting finger, P, with cutting-edges, and the inclined table I, substantially as shown and described.

In testimony whereof I have signed my name to this specification in the presence of two subscribing witnesses.

WOOD C. DOLLENS.

Witnesses:
GEO. H. RENNETT,
E. O. FRINK.